US012624594B2

(12) United States Patent
Foley et al.

(10) Patent No.: US 12,624,594 B2
(45) Date of Patent: May 12, 2026

(54) ADJUSTABLE HINGE FOR A MULTI-POSITION LADDER

(71) Applicant: Tricam Industries, Inc., Eden Prairie, MN (US)

(72) Inventors: Joseph P. Foley, St. Paul, MN (US); Dennis D. Simpson, Plymouth, MN (US); Benjamin P. Williams, Chaska, MN (US)

(73) Assignee: Tricam Industries, LLC, Eden Prairie, MN (US)

( * ) Notice: Subject to any disclaimer, the term of this patent is extended or adjusted under 35 U.S.C. 154(b) by 0 days.

(21) Appl. No.: 18/461,502

(22) Filed: Sep. 6, 2023

(65) Prior Publication Data

US 2024/0035339 A1 Feb. 1, 2024

Related U.S. Application Data

(63) Continuation of application No. 15/464,807, filed on Mar. 21, 2017, now abandoned, and a continuation of application No. 29/589,674, filed on Jan. 4, 2017, now Pat. No. Des. 860,476.

(51) Int. Cl.
| | |
|---|---|
| *E06C 7/50* | (2006.01) |
| *E06C 1/32* | (2006.01) |
| *F16C 11/10* | (2006.01) |

(52) U.S. Cl.
CPC ............... *E06C 7/50* (2013.01); *E06C 1/32* (2013.01); *F16C 11/10* (2013.01)

(58) Field of Classification Search
CPC ..... E06C 1/32; E06C 7/08; E06C 7/50; F16C 11/10; F16C 11/045
See application file for complete search history.

(56) References Cited

U.S. PATENT DOCUMENTS

| | | | | |
|---|---|---|---|---|
| 3,811,151 A | * | 5/1974 | Kuemmerlin | E06C 1/32 |
| | | | | 403/92 |
| 4,216,844 A | * | 8/1980 | Klafs | E05D 11/1007 |
| | | | | 16/329 |
| 4,403,373 A | * | 9/1983 | Kummerlin | E06C 1/32 |
| | | | | 16/326 |
| 4,407,045 A | * | 10/1983 | Boothe | E05D 11/1007 |
| | | | | 403/92 |
| 4,566,150 A | * | 1/1986 | Boothe | E06C 1/32 |
| | | | | 16/349 |
| 4,697,305 A | * | 10/1987 | Boothe | E06C 1/32 |
| | | | | 16/349 |

(Continued)

FOREIGN PATENT DOCUMENTS

| | | | | |
|---|---|---|---|---|
| DE | 4431179 A1 | * | 4/1995 | E06C 7/50 |

*Primary Examiner* — Colleen M Chavchavadze

(57) ABSTRACT

An improved adjustable hinge for a multi-position ladder that is positionable in a variety of configurations while being ergonomic to adjust and which is structurally sound, rigid, and easy to adjust, light in weight, and has a long service life. The mating surfaces of the outer hinge plates, inner hinge plates, and inner hinge center spacer are large, contributing to overall hinge rigidity and stability. The size of the lock button and lock bracket are each relatively large, making them ergonomic to operate, while also being large enough to be operable by a gloved human hand. A method of assembling an improved adjustable hinge for a multi-position ladder that is positionable in a variety of configurations.

14 Claims, 7 Drawing Sheets

(56)                  References Cited

U.S. PATENT DOCUMENTS

| | | | |
|---|---|---|---|
| 4,770,559 A * | 9/1988 | Yoo | F16C 11/10 |
| | | | 403/324 |
| 4,890,950 A * | 1/1990 | Yoo | F16C 11/10 |
| | | | 182/163 |
| 5,954,157 A * | 9/1999 | Grimes | E06C 7/08 |
| | | | 16/329 |
| 6,343,406 B1 * | 2/2002 | Yeh | E06C 1/32 |
| | | | 182/163 |
| 7,047,597 B2 * | 5/2006 | Lee | E06C 1/32 |
| | | | 16/233 |
| 7,140,072 B2 * | 11/2006 | Leng | E06C 1/32 |
| | | | 16/326 |
| 10,487,580 B2 * | 11/2019 | Miao | E05D 11/06 |
| 2003/0037412 A1 * | 2/2003 | Lee | E06C 1/32 |
| | | | 16/326 |
| 2004/0129497 A1 * | 7/2004 | Weiss | E06C 1/39 |
| | | | 182/163 |
| 2004/0216277 A1 * | 11/2004 | Beaver | E06C 1/32 |
| | | | 16/324 |
| 2005/0268434 A1 * | 12/2005 | Burbrink | E06C 1/32 |
| | | | 16/324 |

* cited by examiner

ADJUSTABLE HINGE FOR A MULTI-POSITION LADDER

CROSS-REFERENCE TO RELATED APPLICATIONS

This application is a continuation of application Ser. No. 15/464,807, filed Mar. 21, 2017, which claims the benefit of application Ser. No. 29/589,674, filed Jan. 4, 2017, now U.S. Pat. No. D860,476, each of which is hereby fully incorporated herein by reference.

FIELD OF THE INVENTION

The present invention relates generally to a ladder. More particularly, the present invention relates to an improved adjustable hinge for an ergonomic, multi-position ladder that is structurally sound, rigid, light in weight, and easy to adjust.

BACKGROUND OF THE INVENTION

Portable ladders are commonly used for a variety of applications, with several different styles being widely used. The two best known designs are extension ladders, which must be leaned against a vertical surface for support, and step ladders, which are free standing. For some time it has been known that constructing ladders with two sections that are slidably mounted with respect to each other enables the overall length of the extension ladder to be varied depending upon the desired use of the extension ladder. This feature is particularly useful for transporting the ladder to a desired use location. However conventional extension ladders do not have the ability to stand up without being leaned against another object. In certain circumstances it is not possible to lean the extension ladder against other objects. To overcome this shortcoming, Kummerlin et al., U.S. Pat. No. 3,692,143, pivotally attaches two extension ladders together. This ladder retained the benefits of being able to adjust the height of the ladder while adding the benefit that the ladder could remain erect without leaning against other objects. Multi-position ladders have become very popular in recent years because of their versatility, and are being used for a variety of applications by members of the construction trade, maintenance personnel, and homeowners, among others. Many improvements have been made to the design of multi-position ladders. Simpson et al., U.S. Pat. No. 6,857,503, is directed to a multi-position ladder that is versatile, light weight, and relatively low in cost. A common element of most multi-purpose ladders is the hinge assembly, which enables the adjustability of the ladder's position while also contributing to its stability while in a working position.

Accordingly, many improvements have been made to the design of the hinge components of multi-position ladders. U.S. Pat. Nos. 4,407,045 and 4,566,150, to Boothe, are both directed to a hinge for an articulating ladder. The hinge includes two hinge plates that are pivotally attached with a central hub. Pivoting of the hinge plates is controlled with a locking handle that extends through apertures in the hinge plates. The locking handle is biased to a locking position where the legs on the locking handle extend into the hinge plate apertures. Most hinges on adjustable ladders generally include a locking handle that secures the sections of the ladder in place when in use, and a spring-loaded actuator that is used by the operator to disengage the locking handle in order to adjust the position of the hinge, and accordingly the position of the ladder. Lee et al., U.S. Pat. No. 6,711,780, is directed at a concealed spring within the locking mechanism to prevent the hands or gloves of an operator from becoming jammed in the spring when the press part is pressed. An alternative to the press-part design of adjustable ladder hinges utilizes a locking cam. Sheng, U.S. Pat. No. 5,620,272, is directed toward hinge design that utilizes a locking rod and a coupling disc containing a plurality of holes in various positions to enable hinge position adjustment. Purkapile, U.S. Pat. No. 4,773,503, is directed at a hinge that employs circular teeth on mating faces of the adjustable hinge and a cam lock, offering the ability for the hinge to assume a greater number of adjustable positions than that available with the aforementioned design.

When selecting a multi-purpose ladder for use or purchase, users may consider many factors including product cost, ladder weight, ease of use, and safety. In particular, the ease of use for a multi-position ladder pertains to the ease of adjustability for its hinges, and the speed at which the hinges can be adjusted for repositioning. For users of multi-position ladders in the construction and crafts trades, where the multi-position is used extensively in their work, it may be cumbersome to operate the adjustment features on popular hinge styles that require pushing inward on the press part from the outside of the ladder on each side of to disengage the locking handle, particularly when the ladder is being used in a confined space. The relatively small size of the press part is not very ergonomic and comfortable to operate, especially when this motion may be repeated numerous times by an operator during the work day. Also, while it may be possible to pull inward on the locking handle from the inside of the ladder, the relatively small size in most hinge styles makes it difficult to do so, especially by a hand that is particularly large or which may be gloved. Again, as noted above, the relatively small size of this style is not very ergonomic and comfortable to operate. Those who are skilled in the art will appreciate that operators who utilize adjustable ladders in their daily work will find the lack of ease in adjustment of a multi-position ladder to be burdensome.

It is understandable that ladder hinges must be designed and manufactured to prevent their failure during use, so as to prevent potentially catastrophic injury to their users. Aside from preventing component failure, another important safety consideration in ladder construction is the rigidity of a ladder and the solidness and stability that an operator perceives when climbing upon it. Those who are skilled in the art will appreciate that a ladder which is more rigid will wobble less, particularly when the user climbs on it to greater heights, and that a ladder that wobbles more can adversely affect the real and perceived safety of an operator when using it. By their very nature, an adjustable hinge on a multi-position ladder may contribute to the wobble in the ladder when it is in use. Therefore, an ongoing challenge for multi-position ladder manufacturers is to provide an adjustable hinge that optimizes the compromise between weight, cost, ease of use, and rigidity.

SUMMARY OF THE INVENTION

The challenges outlined above are addressed and overcome by the present invention. The present invention is directed to an improved adjustable hinge for a multi-position ladder that meets the objectives of low cost, light weight, ease of use, and safety. The hinge of the present invention provides a significant improvement over the prior art in terms of its ease of use, providing a locking button on the outside of the hinge and a lock bracket on the inside of the hinge which are both relatively large and ergonomic to actuate. The larger size of the locking button makes it very ergonomic to push inward by operators having hands of many different sizes. Similarly, the larger size of the lock bracket makes it much easier for an operator to pull inward, easily accommodating larger hands and particularly a gloved hand. The present invention includes an improved locking mechanism that, along with the more ergonomic design of the locking button and lock bracket, improves both the ease of adjustment and the safety of the adjustable hinge.

The present invention includes hinge dimensions that are relatively large, while being constructed of materials that offer light weight, high strength, and tight dimensional tolerances. Together these features result in an adjustable hinge that is significantly more rigid and stable than those in the prior art, thereby producing significantly less wobble in the multi-position ladder when it is in use. This may enhance the safety and security a user experiences in operating and climbing upon the multi-position ladder.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figures 1A, 1B:
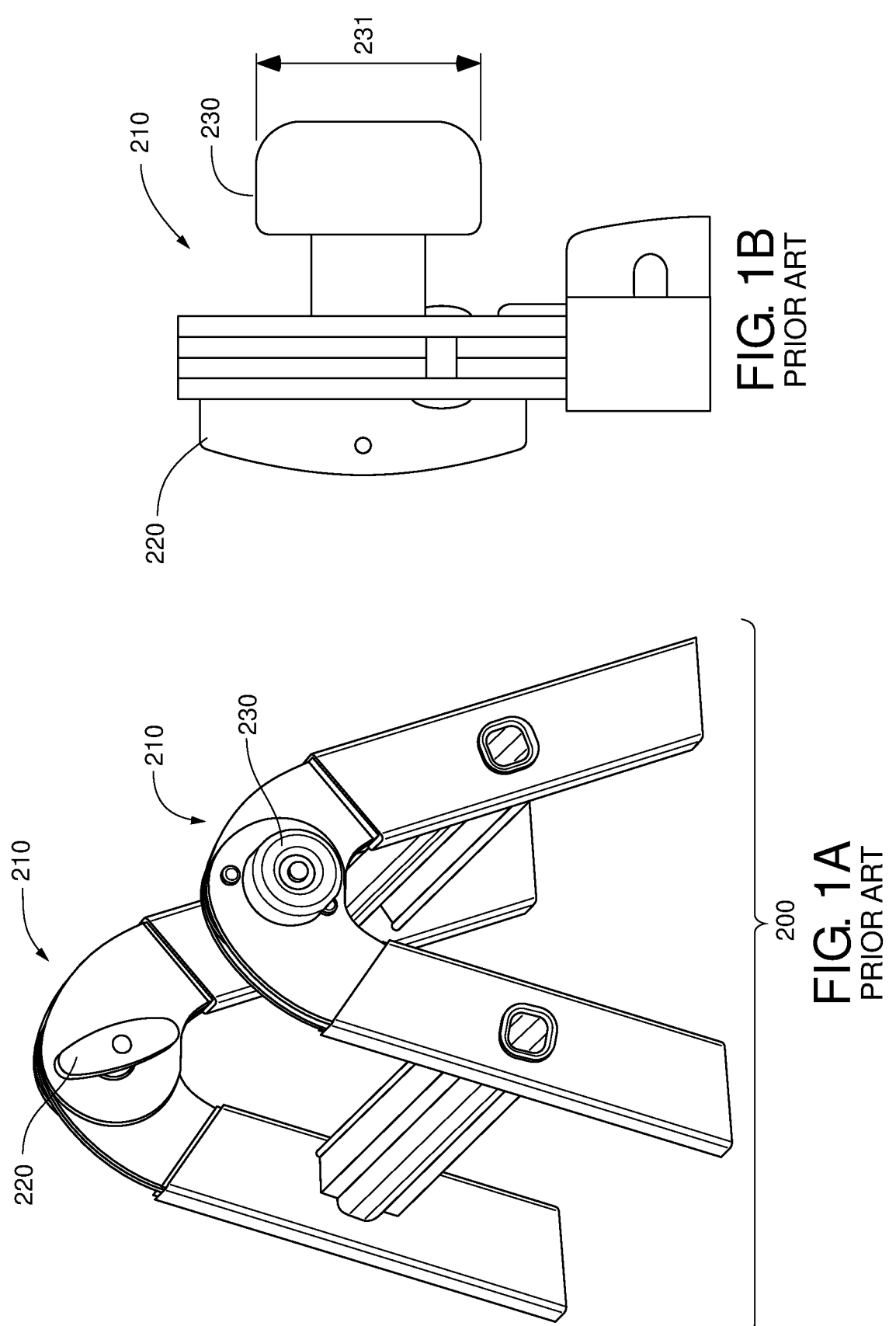
FIG. 1A is a perspective view of a typical adjustable hinge a multi-position ladder as seen in the prior art.
FIG. 1B is a side view of a typical adjustable hinge a multi-position ladder as seen in the prior art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The preferred embodiment for the improved adjustable hinge for a multi-position ladder is in pairs, with a typical embodiment employing two of the improved adjustable hinges on a multi-position ladder wherein the locking button on each hinge is located on the outside of the ladder rails, and the lock bracket on each hinge is located on the inside of the ladder rails. It should be noted, however, that other embodiments of the present invention may utilize a greater number of hinges on the ladder upon which they are installed. For example, a multi-segmented multi-position ladder may employ four, six, or eight improved adjustable hinges. In an embodiment, it is theoretically possible for a greater number of improved adjustable hinges to be employed. On the other hand, in an embodiment it may be possible to use a single improved adjustable hinge. Because the most familiar embodiment of an improved adjustable hinge for a multi-position ladder is to use two hinges, the discussion of both the prior art and the present invention will describe and illustrate an embodiment utilizing a pair of adjustable hinges. The advantages of the present invention may be understood by first referring to a typical adjustable hinge for a multi-position ladder of the prior art, as shown in FIGS. 1A and 1B.

Referring to FIG. 1A, a perspective view of a typical adjustable hinge 210 for a multi-position ladder 200 as seen in the prior art. A typical embodiment in the prior art utilizes two adjustable hinges 210, each adjustable hinge 210 having press part 230 that is situated on the outside of adjustable hinge 210, and locking handle 220 that is situated on the inside of adjustable hinge 210. Press part 230 has diameter 231. To adjust the multi-position ladder 200 a user must change the position of adjustable hinges 210 by pushing in on press part 230. Alternatively, a user may simultaneously push in on press part 230 and pull inward on locking handle 220. As noted, press part 230 has diameter 231. The size of both press part 230 and locking handle 220 relative to the typical human hand is small, rendering it somewhat difficult for a user to comfortably perform this operation. For example, the relatively small size of locking handle 220 renders it difficult to grip by the fingers of a hand when a glove is worn on that hand. The relatively small size of adjustable hinge 210 relative to the size of the rails on the multi-position ladder is also noteworthy. The relatively small size of adjustable hinge 210 also enables a greater amount of wobble in the multi-position ladder, thereby reducing the stability of the multi-position ladder 200. This can result in a diminished level of perceived safety for a typical user of the multi-position ladder 200 of the prior art.

Referring to FIG. 1B, a side view of an embodiment of a typical adjustable hinge 210 for a multi-position ladder 200 as seen in the prior art. As noted earlier, a typical embodiment utilizes two hinges 210 on a multi-position ladder 200, with press part 230 being oriented on the outside of each adjustable hinge 210. This view is taken from of Simpson, U.S. Pat. No. 6,857,503, directed at a multi-position ladder which is typical of the prior art. As noted earlier, the relatively small size of press part 230 presents a challenge for a typical user to operate, in that press part 230 is small and therefore not comfortable or ergonomic to operate.

The remaining figures all illustrate embodiments of the present invention. FIGS. 2-5 each illustrate a different perspective of the adjustable hinge according to an embodiment of the present invention, with a single adjustable hinge being illustrated and described therein. It is noted that a typical embodiment will employ a pair of adjustable hinges on a multi-position ladder.

Figure 2:
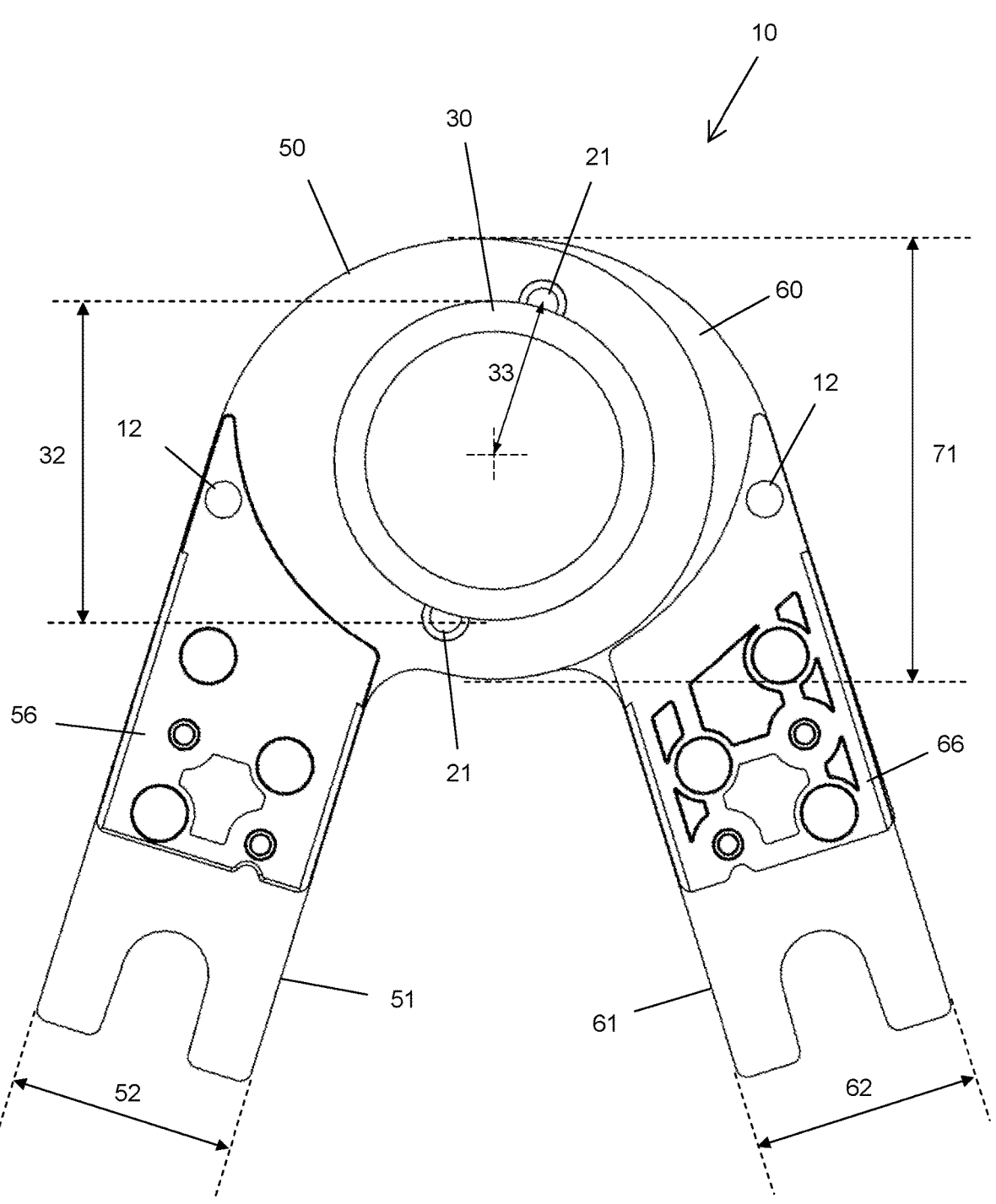
FIG. 2 is a front view of the improved adjustable hinge for a multi-position ladder according to an embodiment of the present invention.

FIG. 2 shows the front view of adjustable hinge 10. The front view is also referred to as the outside view, because a typical embodiment utilizes two adjustable hinges 10 on a multi-position ladder 100, with each adjustable hinge 10 being situated with its front on the outside of the multi-position ladder 100.

Referring to FIGS. 2-5, the several structural components of adjustable hinge 10 which contribute to the sturdiness of the multi-position ladder 100 on which it is installed are apparent. Adjustable hinge 10 is comprised of two outer hinge plates 50, two inner hinge plates 60, and inner hinge center spacer 65 which are sandwiched together. While the materials of construction may vary, a typical embodiment of the present invention utilizes an aluminum alloy for the material of outer hinge plates 50 and inner hinge plates 60, and a synthetic polymer such as polyoxymethylene for inner hinge center spacer 65. Together these materials provide an excellent balance of light weight, low cost, ease of use, strength, hinge rigidity, and long service life. Adjustable hinge 10 is additionally comprised of outer hinge center spacer 55, two outer hinge outside spacers 56, and two inner hinge outside spacers 66, which are all sandwiched together as depicted, thereby enabling adjustable hinge 10 to be attached to multi-position ladder 100 in a typical embodiment of the present invention.

Referring to FIG. 2, lock button 30 has a diameter 32. Outer hinge plate 50 and inner hinge plate 60 each have a hinge plate diameter 71, with hinge plate diameter 71 defining the area of the mating surfaces between outer hinge plates 50, inner hinge plates 60, and inner hinge center spacer 65. In its assembled state, as shown in FIG. 2, adjustable hinge 10 has two hinge extensions, each extending from its respective hinge plate. Outer hinge plate 50 has outer hinge extension 51, and inner hinge plate 60 has inner hinge extension 61. Outer hinge extension 51 will have outer hinge extension width 52, and inner hinge extension 61 will have inner hinge extension width 62. In an embodiment, outer hinge extension width 52 and inner hinge extension width 62 will be generally similar to each other, to enable the connection of adjustable hinge 10 to multi-position ladder 100 in a typical embodiment of the present invention.

In an embodiment, outer hinge extension 51 is comprised of two outer hinge plates 50, two outer hinge outside spacers 56, and outer hinge center spacer 55, sandwiched together and held together by rivet 12. Similarly, in an embodiment, inner hinge extension 62 is comprised of two inner hinge plates 60, two inner hinge outside spacers 66, and inner hinge center spacer 65, sandwiched together and held together by rivet 12. Those who are skilled in the art are familiar with the use of rivets in mechanical assemblies, and they will appreciate that any suitable mechanical fastener may take the place of a rivet. Examples of suitable mechanical fasteners include threaded fasteners, and all forms of suitable mechanical fasteners are within the scope of various embodiments of the present invention.

The actual size and thickness of the various components of adjustable hinge 10 described above will differ in varying embodiments, and are therefore not specified. Any particular embodiment will specify various component sizes and thicknesses that help optimize the balance of light weight, low cost, ease of use, strength, and hinge rigidity for a particular use. Those who are skilled in the art of ladders will appreciate that a larger ladder, or one which is designed to carry a greater weight load, may require a stronger hinge, and therefore a greater component size and thicknesses. However, in a preferred embodiment, the overall thickness of the outer hinge extension 51 (which is comprised of two outer hinge plates 50, two outer hinge outside spacers 56, and outer hinge center spacer 55) should be approximately the same as the overall thickness of the inner hinge extension 61

(which is comprised of two inner hinge plates 60, two inner hinge outside spacers 66, and inner hinge center spacer 65.) This approximate equivalence in overall thickness of the inner and outer hinge extensions will enable the use of adjustable hinge 10 on multi-position ladder 100 having a uniform geometry on both sides of adjustable hinge 10.

The relatively large size and tight mechanical tolerances of the mating surfaces of the outer hinge plates 50, inner hinge plates 60, and inner hinge center spacer 65 of the illustrated embodiment of the present invention is an advancement over the prior art. The surface area of these mating surfaces is significantly larger than that of the prior art, being defined by hinge plate diameter 71 as noted in FIG. 2. This relatively large mating surface significantly contributes to the rigidity and stability of adjustable hinge 10. Moreover, locking pins 21 are located at radius 33 relative to the axis of rotation of adjustable hinge 10, as seen in FIG. 2. Radius 33 of this embodiment of the present invention is significantly greater than that of the prior art. The magnitude of radius 33 is proportional to the moment arm created by locking pins 21 in resisting a rotational force applied to adjustable hinge 10, directly contributing to the strength, rigidity, and stability of adjustable hinge 10. For any particular size and strength of locking pin 21, the greater magnitude of radius 33 in the present embodiment results in a greater strength, and therefore stability, of adjustable hinge 10. Finally, the tight mechanical dimensional tolerances and the use of a synthetic polymer (such as polyoxymethylene) for the inner hinge center spacer 65 additionally contributes to improved rigidity and stability of adjustable hinge 10 over the prior art.

Taken together, the combined effects of the larger components and mating surfaces of adjustable hinge 10, greater radius 33 of locking pins 21 from the rotational axis of adjustable hinge 10, and tighter material dimensional tolerances of the components of adjustable hinge 10, the present embodiment represents a significantly stronger and more rigid design compared to the prior art. Alternative embodiments that that incorporate these various improvements are within the scope of the claimed invention. For example, the inner hinge center spacer 65 may be eliminated and a single inner hinge plate 60 may be used while yielding similar functionality. Similarly, a single locking pin 21 may be used or more than two locking pins 21 may be used, while yielding similar functionality.

Figure 6:
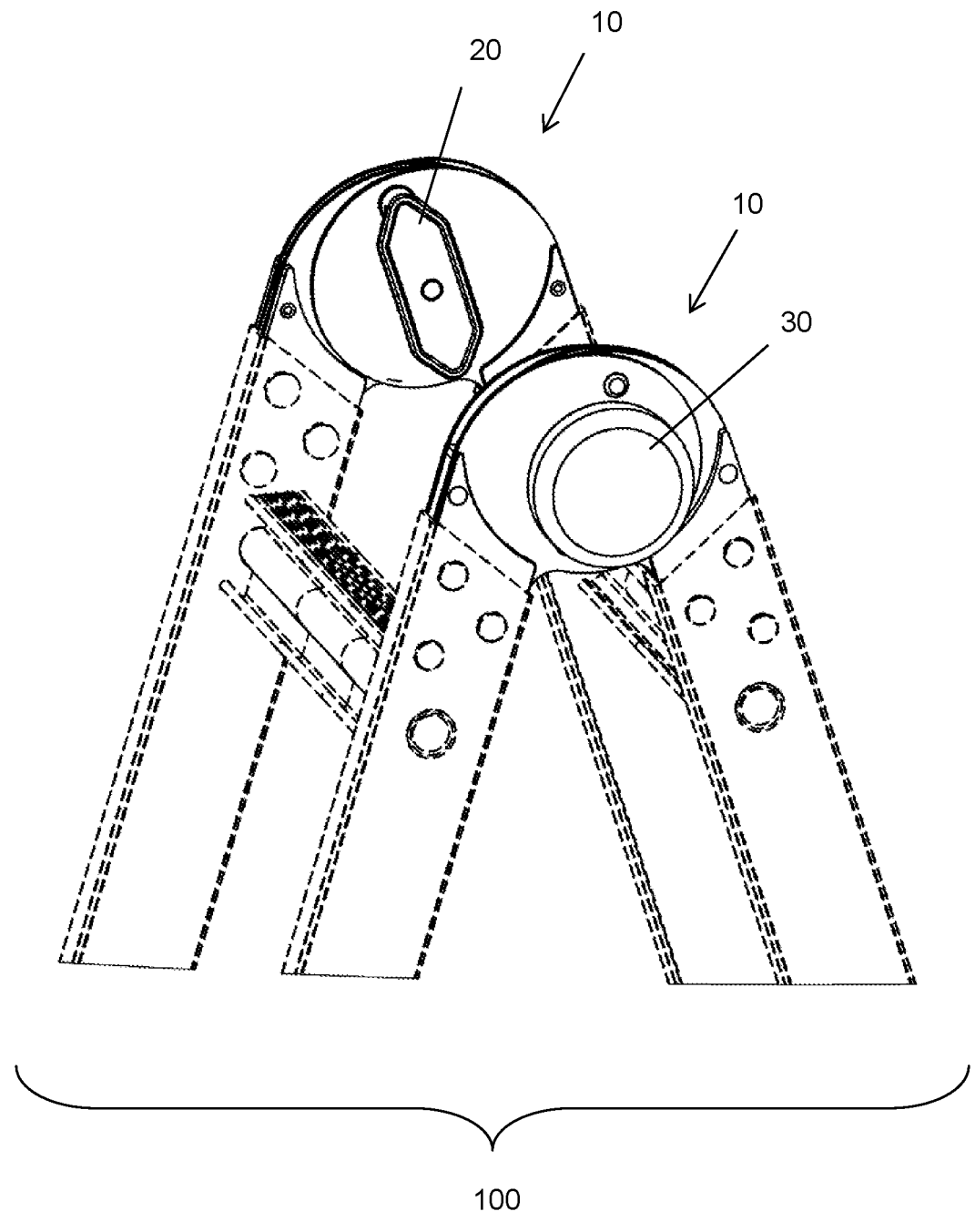
FIG. 6 is a perspective isometric elevated side view of the upper portion of a multi-position ladder utilizing an embodiment of the present invention, wherein a pair of adjustable hinges are utilized on the multi-position ladder and are shown in one of the possible working positions of the hinges.

Now referring to FIG. 6, a view of the upper portion of multi-position ladder 100 utilizing two adjustable hinges 10 in an embodiment of the present invention, it can be seen that lock button 30 is on the outside of the multi-position ladder, that is, facing away from the ladder rungs. Similarly, it can be seen that lock bracket 20 is on the inside of the multi-position ladder, i.e., facing toward the ladder rungs. FIG. 6 illustrates an embodiment whereby two adjustable hinges 10 are utilized on a multi-position ladder 100, with the multi-position ladder 100 being in one of its many possible working positions. The relatively large size of lock button 30 is significant, in that it is much larger than that of the prior art. The relatively large size of lock button 30, having diameter 32 as shown in FIG. 2, enables a user of the multi-position ladder to easily and comfortably push in on it, an action that is performed prior to adjusting the position of adjustable hinge 10, and therefore, the position of the multi-position ladder 100. The force a user exerts on lock button 30 can be modeled by the equation Force=Pressure× Area, with Pressure being a force per unit area, and the Area being the surface area of lock button 30 the user is applying Force to. The relatively large size of lock button 30, having diameter 32, allows a typical user to push in on it with a correspondingly lower Pressure, either a bare hand or a gloved hand, resulting in greater ease of operation and a more comfortable user experience. Those who are skilled in the art will appreciate that hand gloves are frequently worn by users of ladders, and it is inefficient and cumbersome for a user to remove a glove from a hand to make a mechanical adjustment.

The relatively large size of lock bracket 20 is greater than that of the prior art, with both its width (not labeled in the figures) and its length 23 being increased. The relatively large size of lock bracket 20 allows a typical user to easily and comfortably pull it in with either a bare hand or a gloved hand, with the user's fingers being more easily accommodated by depth 22 and length 23 of lock bracket 20. The relatively large size of lock bracket 20 having depth 22, relatively greater length 23, and a correspondingly greater lock bracket width, enables a user of multi-position ladder 100 to easily and comfortably pull in on lock bracket 20, an action that may be performed in lieu of pushing in on lock button 30 prior to adjusting the position of adjustable hinge 10, and therefore, the position of the multi-position ladder 100. The relatively large size of lock bracket 20 allows a typical user to easily and comfortably pull it in with either a bare hand or a gloved hand, with the user's fingers being more easily accommodated by depth 22 and length 23 of lock bracket 20. As noted earlier, those who are skilled in the art will appreciate that hand gloves are frequently worn by users of ladders, and it is inefficient and cumbersome for a user to remove a glove from a hand to make a mechanical adjustment.

Figure 3:
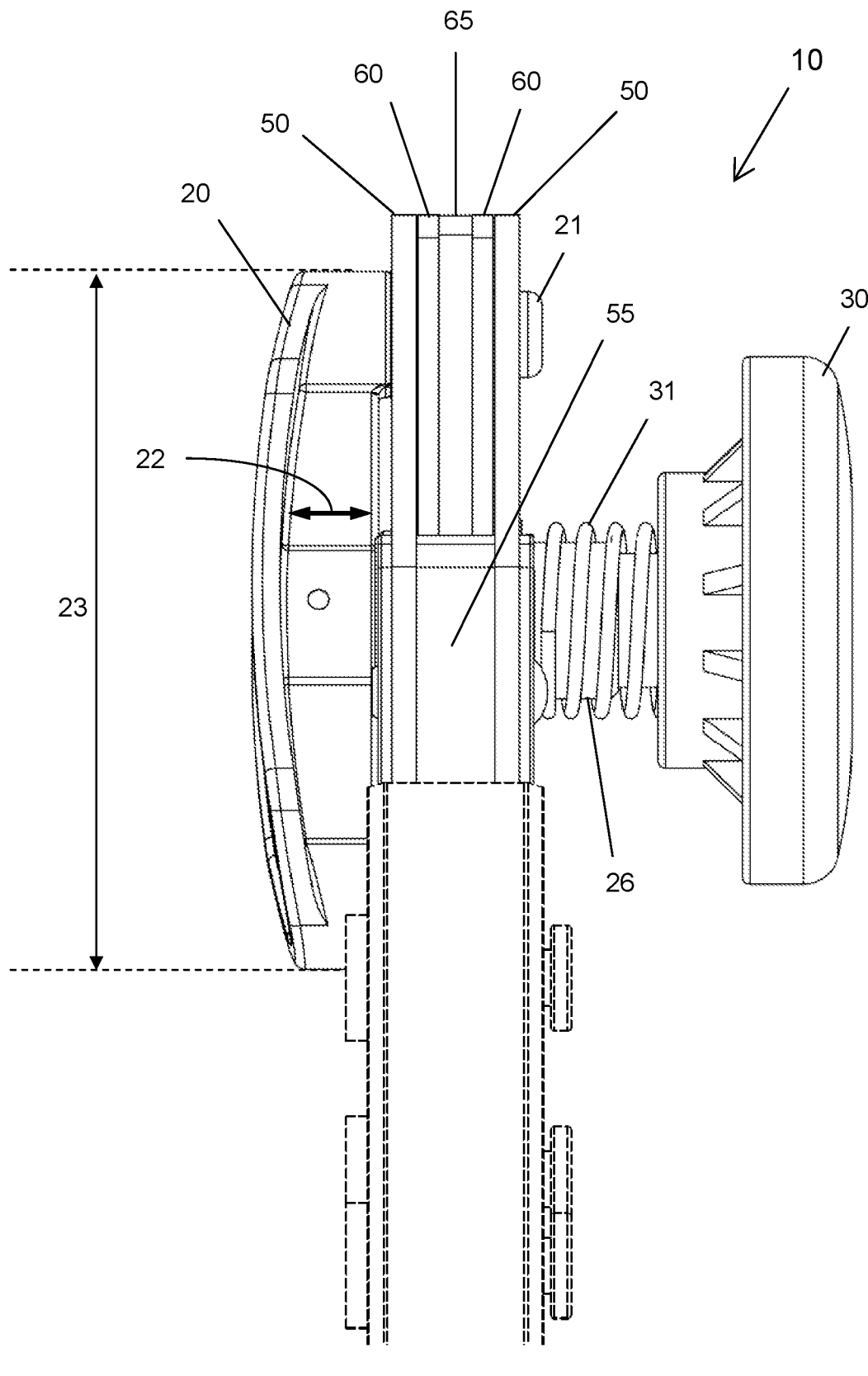
FIG. 3 is a side view of the improved adjustable hinge for a multi-position ladder according to an embodiment of the present invention.
Figure 4:
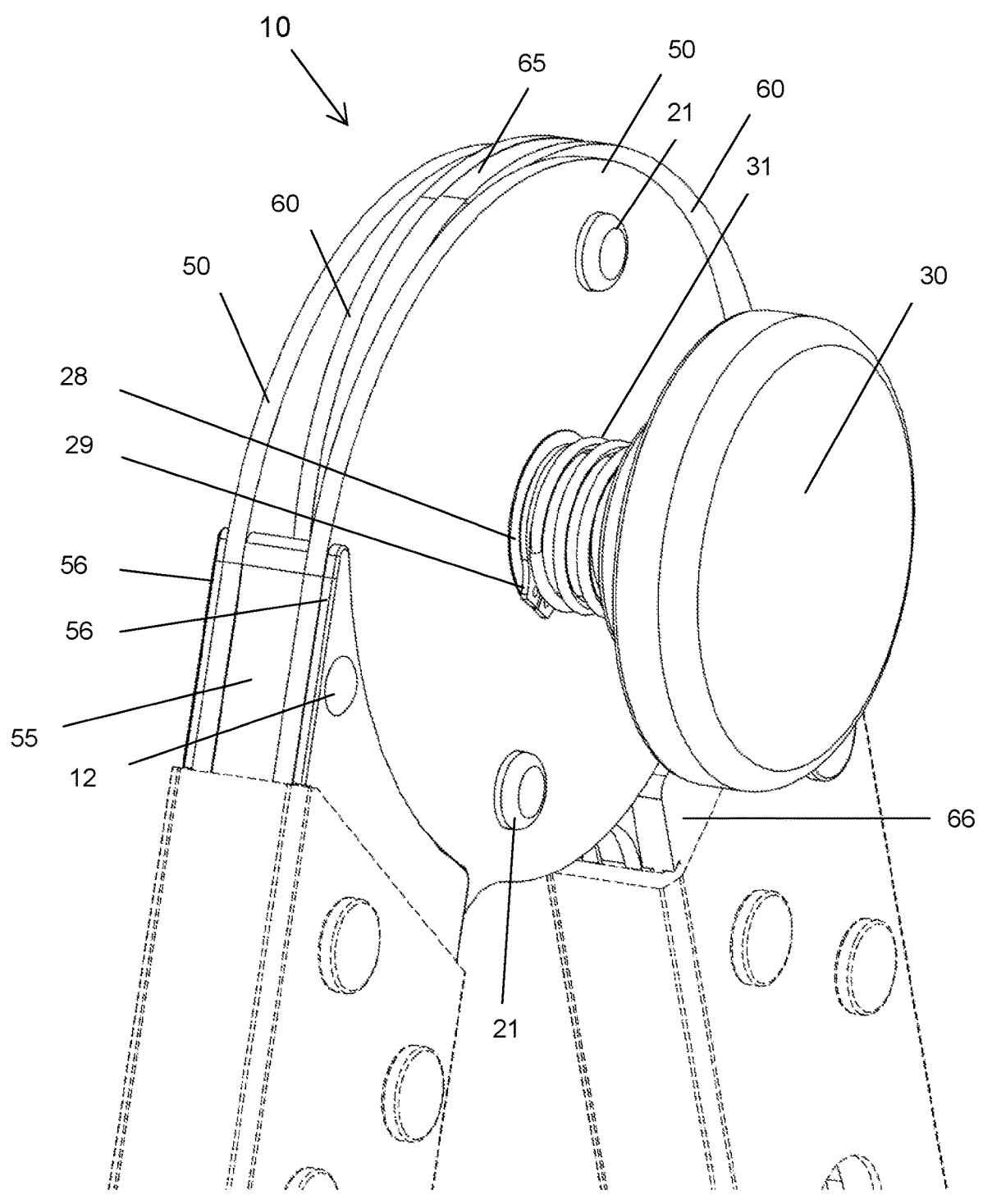
FIG. 4 is an outer perspective view the improved adjustable hinge for a multi-position ladder according to an embodiment of the present invention.
Figure 5:
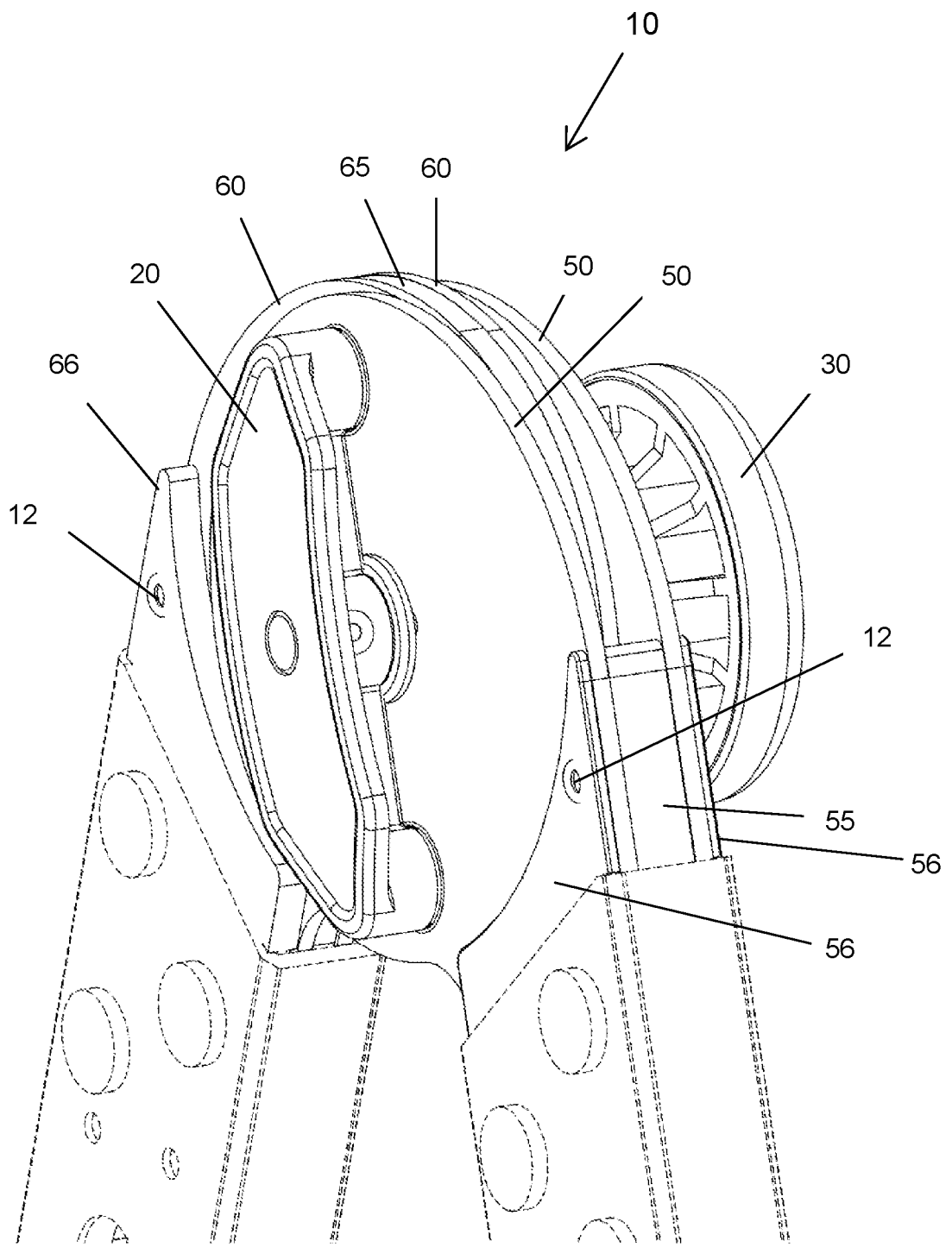
FIG. 5 is an inner perspective view the improved adjustable hinge for a multi-position ladder according to an embodiment of the present invention.

Depending on the location of the user relative to the multi-position ladder 100, it may be more convenient to pull in on one or both lock brackets 20 to change the position of adjustable hinge 10. A typical use scenario for a multi-position ladder 100 may be as a free-standing step-ladder, with the adjustable hinge 10 position being as depicted in FIG. 6. A multi-position ladder 100 in the position of a free-standing step-ladder may be placed adjacent to the side of a building, with the rotation axes of adjustable hinges 10 being perpendicular to the face of the building. In this scenario, it would be convenient for a user to push in on lock button 30 on adjustable hinge 10 being located furthest from the side of the building, and to pull in on lock bracket 20 on adjustable hinge 10 being located closest to the side of the building. As shown in FIG. 3, lock bracket 20 has depth 22 and length 23, with the value of depth 22 and length 23, and the correspondingly greater lock bracket width, being great enough for a typical user's fingers to comfortably grip lock bracket 20 to pull it outward, whether or not the user's fingers are covered with gloves. As noted, the relatively large size of both lock button 30 and lock bracket 20 enables a user with a gloved hand to easily and comfortably perform these various actions in order to adjust the position of adjustable hinges 10.

Figure 7:
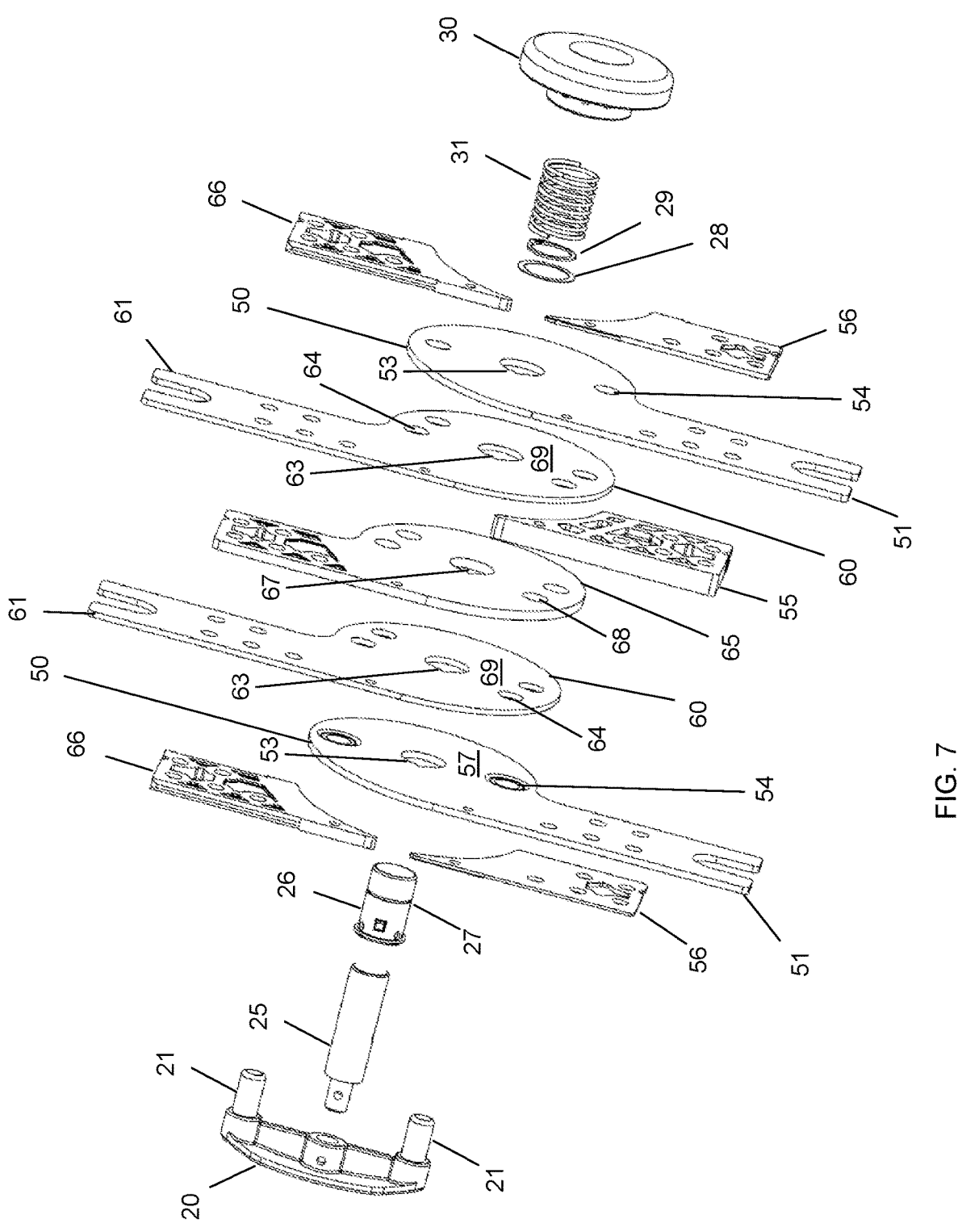
FIG. 7 is an exploded view of the individual components of the improved adjustable hinge for a multi-position ladder according to an embodiment of the present invention.

Finally, referring to FIG. 7, an exploded view of the individual components of adjustable hinge 10 of an embodiment of the present invention is presented. Most of the components described earlier, under FIGS. 2-5, are shown in this view and are labeled accordingly. An understanding of the functioning of the locking mechanism requires noting the various apertures that exist in components of adjustable hinge 10. Outer hinge plate 50 contains center aperture 53 and two outer apertures 54. Inner hinge plate 60 contains center aperture 63 and four outer apertures 64. Inner hinge center spacer 65 contains center aperture 67 and four outer apertures 68. Lock bracket 20 contains two locking pins 21, with the size of locking pins 21 being selected to accommodate the sizes of outer apertures 54, 64, 68. When adjustable hinge 10 is in a working position, the two locking pins 21 engage in outer apertures 54, 64, 68 to mechanically lock these components into position with respect to each other. Center lock pin 25 passes through center apertures 53, 63, 67, forming the axis of rotation for adjustable hinge 10. Lock bracket 20 is matably attached to lock button 30 by means of center lock pin 25 and lock sleeve 26. When adjustable hinge 10 is assembled, C-clip 29 matably attaches to groove 27 on lock sleeve 26. Lock spring 31 provides a bias force to push lock button 30 away from the front facing outer hinge plate 50, with washer 28 providing a bearing surface for the force of the lock spring 31 on the front face of outer hinge plate 50.

The action of pushing in on lock button 30 pushes center lock pin 25, allowing it to slide within lock sleeve 26, thereby compressing lock spring 31. Center lock pin 25 is matably attached to lock bracket 20. Therefore, the action of pushing in on lock button 30 causes lock bracket 20 to be moved away from the inward-most outer hinge plate 50, thereby pulling locking pins 21 out of outer apertures 64, 68. This action allows the outer hinge plates 50 to rotate relative to inner hinge plates 60, with the axis of rotation being defined by center lock pin 25. Because of the rigid mating of the lock bracket 20 to center lock pin 25 to lock button 20, it can be seen that the action of pulling inward on lock bracket 20 produces the same effect of pushing inward on lock button 30, thereby disengaging locking pins 21 from outer apertures 64, 68.

After adjustable hinge 10 is adjusted to the desired position, being defined by one of the allowable positions that exist by the position of outer apertures 54, 64, 68, the bias force caused by compressed lock spring 31 will push outward on lock button 30, thereby pulling the matably attached assembly of lock button 30, center lock pin 25, and lock bracket 20 toward the outside face of adjustable hinge 10. This action in turn forces locking pins 21 back into outer apertures 64, 68, thereby securing the position of adjustable hinge 10 in the new desired working position of adjustable hinge 10 (and correspondingly, the position of multi-position ladder 100.) The above description involved a single adjustable hinge 10, but it will be obvious to one who is skilled in the art of ladders that in a typical embodiment that utilizes two adjustable hinges 10 on a multi-position ladder, both adjustable hinges 10 must be adjusted to the new working position of the multi-position ladder.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. An adjustable hinge for a multi-position ladder, comprising:

two outer hinge plates, each outer hinge plate having an outer hinge plate mating surface;

two inner hinge plates, each inner hinge plate having an inner hinge plate mating surface, the inner hinge mating surface having an inner hinge mating surface diameter;

a center lock pin;

a lock sleeve;

a lock button having a locked position and an unlocked position and a diameter;

a lock bracket having a locked position and an unlocked position, said lock bracket having a pair of locking pins, each locking pin having an equal locking pin radius;

two outer hinge outside spacers, each outer hinge outside spacer disposed opposite each outer hinge plate mating surface;

two inner hinge outside spacers;

an outer hinge center spacer;

a lock spring coaxial to and surrounding the lock sleeve and between the lock button and one of the outer hinge plates biasing the lock bracket in the locked position, the lock spring being visible when the lock button is in the locked position; and wherein said outer hinge outside spacers, said outer hinge plates, and said outer hinge center spacer form an outer hinge extension having a width;

wherein said inner hinge outside spacers and said inner hinge plates form an inner hinge extension having a width, the inner hinge extension width defined by a perpendicular distance between parallel opposite edges of the inner hinge plates;

wherein the inner hinge plate mating surface diameter is a length within a range defined between 170-200% of the inner hinge extension width;

wherein the lock button diameter is greater than the inner hinge extension width and the lock button diameter is generally equal to two times the locking pin radius.

2. The adjustable hinge of claim 1 wherein the diameter of the lock button is at least 110% of the inner hinge extension width.

3. The adjustable hinge of claim 1, wherein the radius of the lock bracket is at least 75% of the inner hinge extension width.

4. The adjustable hinge of claim 1 wherein the outer hinge plates and inner hinge plate are manufactured from an alloy of aluminum.

5. The adjustable hinge of claim 1 wherein the outer hinge plates and inner hinge plates are manufactured from an alloy of steel.

6. The adjustable hinge of claim 1 further comprising an inner hinge center spacer, wherein the inner hinge center spacer is manufactured from a synthetic polymer.

7. The adjustable hinge of claim 6 wherein the inner hinge center spacer is manufactured from polyoxymethylene.

8. The adjustable hinge of claim 1 wherein the outer hinge outside spacers and inner hinge outside spacers are manufactured from a synthetic polymer.

9. The adjustable hinge of claim 1 wherein the outer hinge outside spacers and inner hinge outside spacers are manufactured from polyoxymethylene.

10. The adjustable hinge of claim 1 wherein the outer hinge outside spacers and inner hinge outside spacers are manufactured from an alloy of aluminum.

11. The adjustable hinge of claim 1 wherein the outer hinge outside spacers and inner hinge outside spacers are manufactured from an alloy of steel.

12. A multi-position ladder, comprising:

two adjustable hinges, each of two said hinges comprising:

two outer hinge plates, each outer hinge plate having an outer hinge plate mating surface;

two inner hinge plates, each said inner hinge plate having an inner hinge plate mating surface, the inner hinge plate mating surface having an inner hinge plate mating surface diameter;

a center lock pin;

a lock sleeve;

a lock button having a locked position and an unlocked position and having a lock button diameter;

a lock bracket having a locked position and an unlocked position, said lock bracket having a locking pin, the locking pin having a locking pin radius;

two outer hinge outside spacers, each outer hinge outside spacer disposed opposite each of said two outer hinge plate mating surfaces;

an inner hinge center spacer;

two inner hinge outside spacers;

an outer hinge center spacer;

a lock spring coaxial to and surrounding the lock sleeve and between the lock button and one of the outer hinge plates biasing the lock bracket in the locked position, the lock spring being visible when the lock button is in the locked position; and wherein said outer hinge outside spacers, said outer hinge plates, and said outer hinge center spacer form an outer hinge extension having a width; and wherein said inner hinge outside spacers and said inner hinge plates form an inner hinge extension having a width, the inner hinge extension width defined by a perpendicular distance between parallel opposite edges of the inner hinge plates;

wherein each inner hinge plate mating surface diameter is a length of 170-200% of the inner hinge extension width;

wherein the lock button diameter is greater than the inner hinge extension width and the lock button diameter is generally equal to two times the locking pin radius; and a multi-position ladder rail matably attached to each inner hinge extension; and a multi-position ladder rail matably attached to each outer hinge extension.

13. The multi-position ladder of claim 12 wherein the multi-position ladder is primarily manufactured from aluminum.

14. The multi-position ladder of claim 12 wherein the multi-position ladder is primarily manufactured from fiberglass.

\*     \*     \*     \*     \*